June 19, 1928.

A. V. VERVILLE

VENTILATING SYSTEM

Filed July 12, 1924

INVENTOR
Alfred V. Verville
BY Robert H. Young
ATTORNEY

June 19, 1928.
A. V. VERVILLE
1,674,535
VENTILATING SYSTEM
Filed July 12, 1924
2 Sheets-Sheet 2
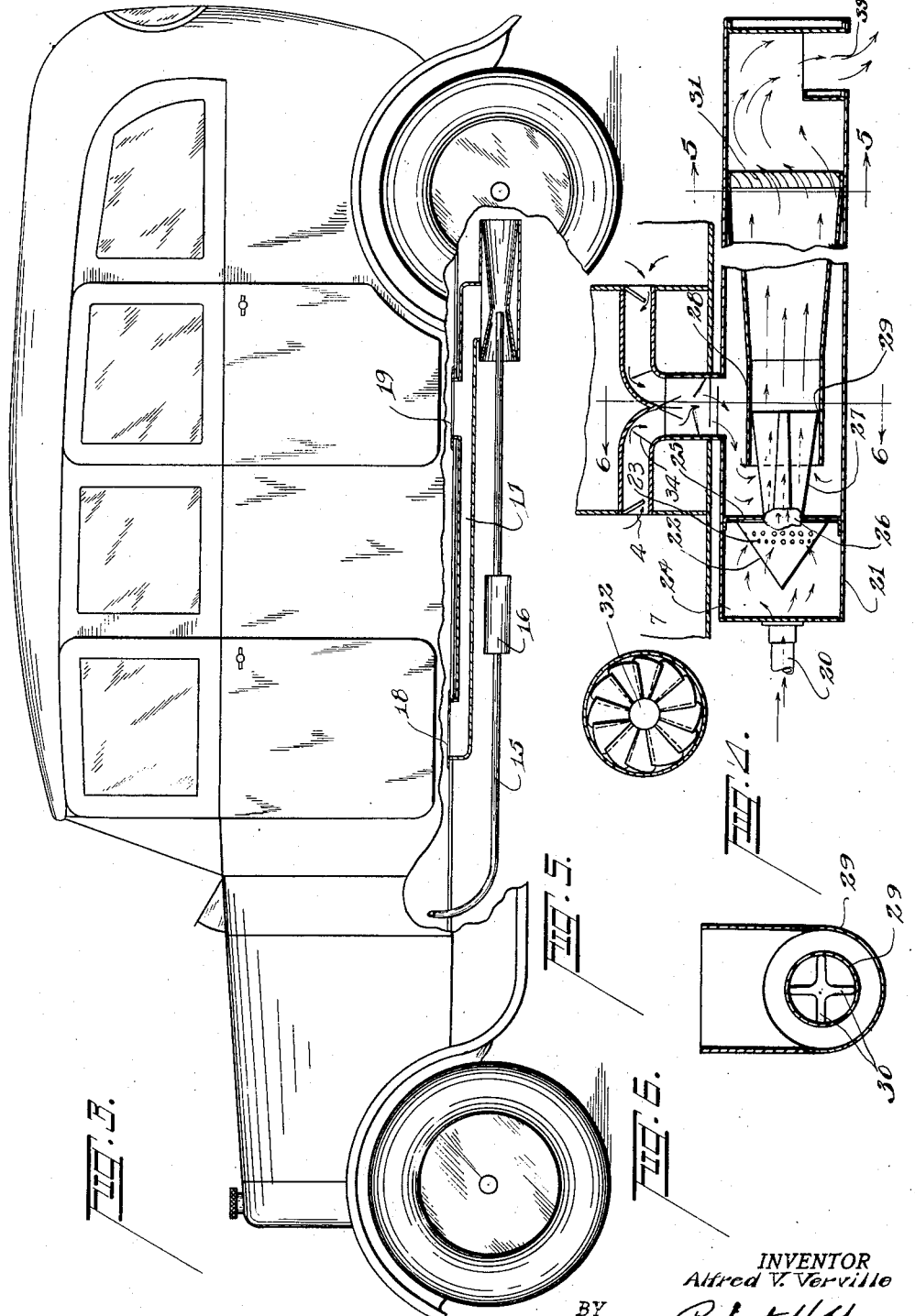
INVENTOR
Alfred V. Verville
BY
ATTORNEY Patented June 19, 1928.

1,674,535

UNITED STATES PATENT OFFICE.

ALFRED V. VERVILLE, OF DAYTON, OHIO.

VENTILATING SYSTEM.

Application filed July 12, 1924. Serial No. 725,600.

This invention relates to a system of ventilating a motor vehicle, and the primary object is to produce a system of ventilation by exhausting the air from the lowest points of the system. This air is preferably exhausted by an injector action of a blast of air blowing through a casing connected to the ventilating apertures. It is also one of the objects of the invention to produce an injector which will be operated by the motor exhaust and in which the ventilating action created by the motor exhaust also has the effect of silencing the noise of the exhaust.

Further objects will be more fully set forth in the attached specification, in the claims, and in the drawings, in which:

Fig. 3 is a side elevation of an automobile showing my invention as applied to a two compartment vehicle.

Fig. 4 is a section of the combined injector and muffler, showing the preferred embodiment thereof.

Fig. 5 is a cross section on the line 5—5 of Fig. 5, and

Fig. 6 is a cross section on the line 6—6 of Fig. 4.

Figure 1:
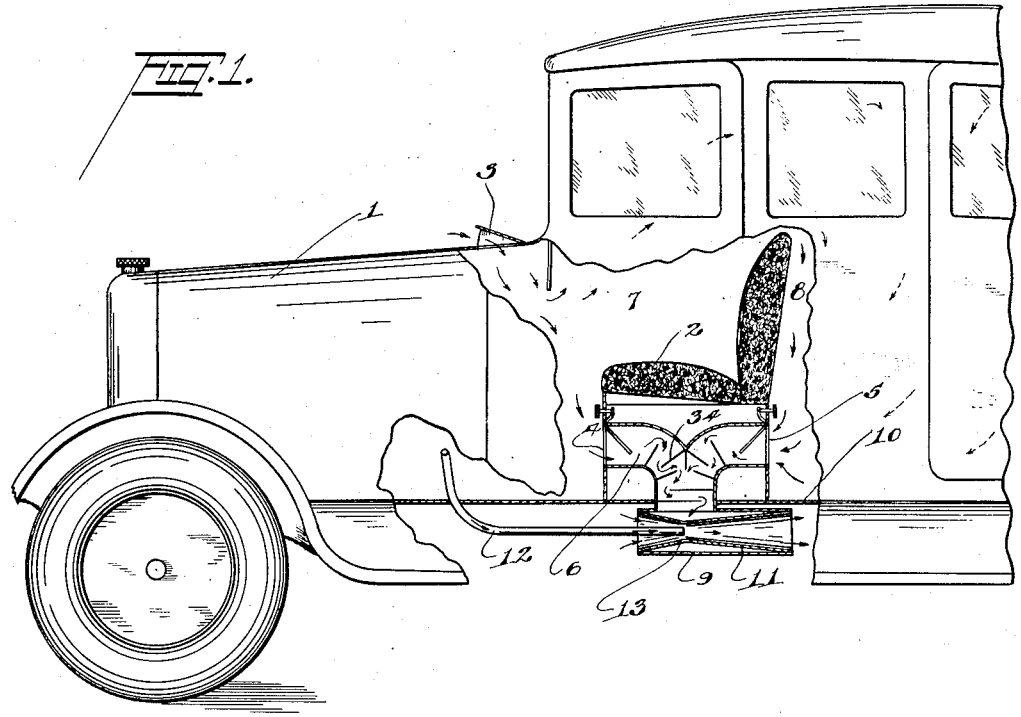
Fig. 1 is a side elevation showing one modification of my invention as applied to an automobile in which part of the surface of the automobile is broken away.

Referring to the drawings more particularly by reference numerals, a motor vehicle 1, which in Fig. 1, is shown as an automobile, is provided with the customary driver's seat 2 which serves to divide the enclosed space within the automobile into the two compartments, namely, the front or driver's compartment, and the rear, or passenger compartment. Heretofore there has been no satisfactory method of ventilating an automobile of this character, namely of the sedan type, since if the air goes out of the compartment at all, in types hereto known, it usually does so at a point close to the heads of the passengers where the draft is quite objectionable. With the system I am about to describe, the air enters into a front ventilator 3 of the customary type, from whence it flows to, and circulates around the driver's compartment and also circulates to and around the passenger compartment since the two are only partly separated by means of the front seat of the vehicle. It is intended that the air shall be exhausted from the compartments to permit the inflow of fresh air and that the air shall flow out through openings 4 and 5 in the front and rear walls below the seat 2.

A connecting passage 6 connects the driver's compartment 7 and also the passenger compartment 8 with a cylindrical open ended casing 9 mounted in a suitable position below the floor 10 of the vehicle. The casing 9 is provided with a Venturi type tube 11 of a length equal to that of the casing 9. At a point close to the restricted portion of the Venturi tube 11 is the end of the pipe 12 which is connected to the exhaust manifold of the motor. It will now be understood that the rapid flow of the exhaust gases through the pipe 12 will create an injector action and a suction effect at the restricted portion of the tube 11 which is connected to the connecting passage 6 by means of a series of comparatively large openings 13. The passage 6 is provided with a series of baffling members 34 alternately spaced on opposite sides of the walls thereof so as to reduce the noise observable in the compartments which might otherwise be caused by the motor exhaust. These baffles also serve to provide a constant outward flow of air through the passage and to smooth out the rapid impulses produced by the motor exhaust. This injector action is assisted by the inflow of outside air which enters the front portion of the tube 11 which at that point is quite large. This assisting action takes place only when the vehicle is in motion, as will of course be understood. The inflowing air is compressed until it reaches the restricted portion of the tube 11 and its tendency to then expand at that point inwardly is responsible for an increasing suction assisting the injection action of the exhaust gases, so as to withdraw the air from the bottom of the compartments. The air flow out of the compartments takes place at points remote from the heads of the passengers where it will not be noticed or objected to.

Figure 2:
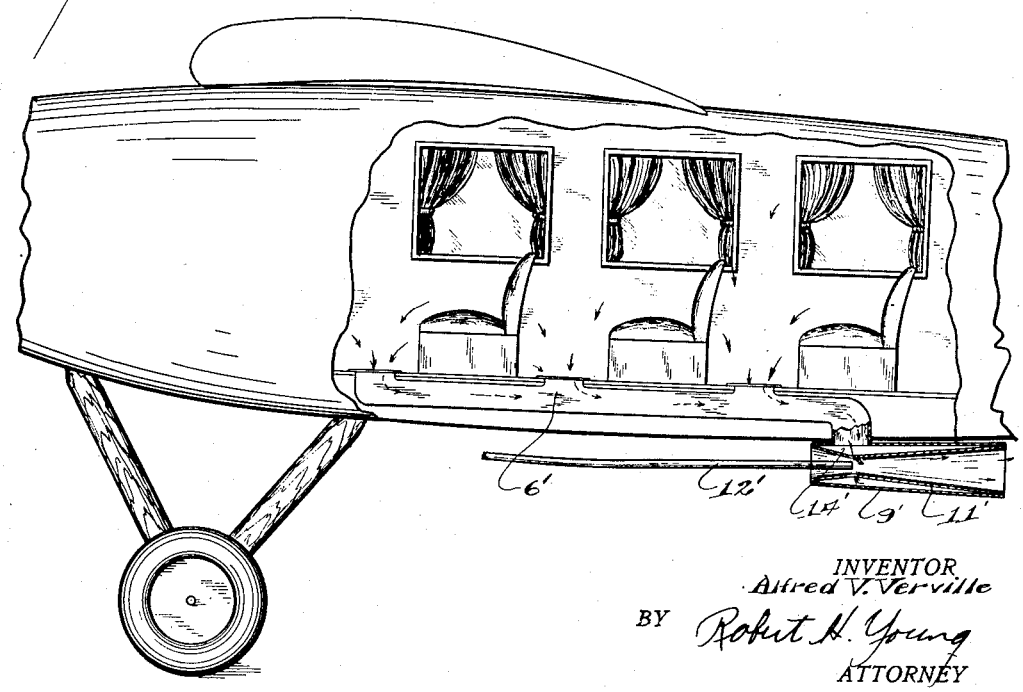
Fig. 2 is a side elevation corresponding to Fig. 1 but showing the adaptation of my invention to an airplane.

In Fig. 2, I have shown a modification in which a similar injecting casing 9' is applied to an airplane. The exhaust pipe 12' is connected to the exhaust manifold and assists the air stream flowing into the front of the injector tube to ventilate the air from the bottom of the passenger compartments. The single connecting passage 6' is adapted to conduct the air from all of the compartments to the chamber 14' surrounding the Venturi-shaped tube 11'. In this case, as well as in the prior automobile application, the air is intended to enter at a point to the front of or at points close to the front of the passenger compartments.

In Fig. 3, is shown a ventilating Venturi-shaped injector tube of the type herein described, which is connected to the exhaust pipe 15, a muffler 16 being used to muffle the exhaust explosions before the exhaust gases are emitted at the rear of the exhaust tube. A connecting passage 17 which may be made of sheet metal or other suitable material, is provided with the front opening 18 in the front compartment of the automobile and also with the opening 19 in the rear compartment. The air will then be exhausted from holes in the floor of the vehicle and conducted by the connecting passage to the Venturi-shaped exhausting tube.

Instead of utilizing the flow of air occasioned by the movement of the vehicle to assist in the ventilating action, it may be desirable to produce the entire ventilating action by means of the exhaust of the motor.

Fig. 4 shows in detail a combined exhauster of the injector type, and muffler. The front pipe 20 is intended to be connected to the exhaust of the motor so as to conduct all of the exhaust gases to the main casing 21 within which is mounted a conical part 22 provided with a series of holes 23. The cone 22 muffles the noise of the exhaust which is permitted to escape from the front chamber 24 through these holes 23. The chamber 24 has a rear partition 25 which constrains all of the exhaust gases to flow through a hole 26 in the center of this partition. The hole 26 is shaped generally in the form of a four-pointed star whose size coincides with the front end of an injector tube 27. This injector tube at its rear end is attached to a rearwardly expanding tube 28 at points 29. The front of the rearwardly expanding tube 28 extends some distance in front of the rear opening in injector tube 27 so that the exhaust gases which are constrained to flow within the injector tube 27 will create a considerable injector action as they expand into the front portion of tube 28. This injector action serves to effectively withdraw the air from the chamber around tube 28 and to take this air from the bottom of the compartment to which the ventilator has been applied. The rear end of the rearwardly expanding tube 28 is permanently attached to the outside casing 21 in any suitable manner, the tube and casing at this point being preferably of approximately equal diameters.

The injector tube 27 is preferably formed of a series of radially extending communicating passages 30, communicating with each other at the central portions of the same. This gives the injector tube a fluted or star shaped appearance, serving to provide a maximum area of contact between the exhaust gases and the ventilated air at the point the injector action takes place without necessitating a large cross sectional area. It will be understood that by this means the velocity of the exhaust gases is maintained high and that it is fully utilized by providing the large contact area in the injector.

At the rear of the casing 21, additional muffling means may be provided to further reduce the noise of the motor explosion. For this purpose, a series of curved vanes 31 fixed to a mounting member 32 is provided so as to completely fill the inside of the casing. The mounting member 32 is mounted fixedly in position so that the blades will be stationary. The rearward flow of the combined exhaust gases and ventilated air as it strikes the fixed vanes in the series 31 will be partially changed into a rapidly rotating and spiralling movement until the exhaust gases reach the exit opening 33 where they are expelled to the outside atmosphere. This charge of direction is produced by the pitch of the blades and serves to effectively reduce the noise without materially increasing the back pressure.

I am aware that various changes may be made in my invention, and it is not intended that I should be limited to the exact construction shown herein for purposes of illustration.

I claim:

1. In a motor vehicle, a compartment, means for exhausting the air from said compartment, comprising a casing, a tube in said casing open at its front end, an injector tube in said casing coacting with said first tube, means creating a rapid flow of gaseous fluid through said injector tube, noise muffling means in said casing, and a connecting passage between said compartment and a point adjacent the front of said first-named tube, baffles in said connecting passage, said tubes forming an ejector for removing the air from said compartment.

2. In a motor vehicle, a compartment, a rearwardly expanding tube open at its front end, an injector tube formed of a number of radial communicating passages coacting with said first tube, means connected to the motor exhaust creating a rapid flow of gaseous fluid through said injector tube, and a connecting passage between said compartment and a point adjacent the front of said first-named tube, said tubes forming an ejector for removing the air from said compartment.

3. In a motor vehicle, a compartment, means for exhausting the air from said compartment comprising a casing, a rearwardly expanding tube in said casing, an injector tube formed of a number of radial communicating passages coacting with said first tube to form an ejector, means connected to the motor exhaust creating a rapid flow of gaseous fluid through said ejector, noise muffling means in said casing, a connecting passage between said compartment and said ejector, and baffles in said connecting passage.

4. In a motor vehicle, a compartment, a tube open at its front end, an injector tube formed of a number of communicating passages co-acting with said first tube, means creating a flow of gaseous fluid through said injector tube, a series of vanes at the rear of said first tube for creating swirling in the gaseous fluid and a connecting passage between said compartment and a point adjacent the front of said first named tube.

5. In a motor vehicle, as set forth in claim 3, a series of curved vanes adjacent the rear end of said tube, and within said casing for the purpose described.

In testimony whereof I affix my signature.

ALFRED V. VERVILLE.